Figure 6:
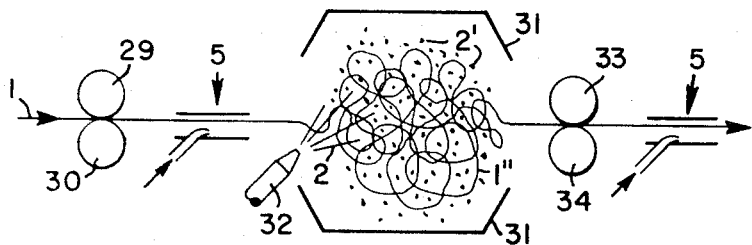

Paquette et al.

United States Patent [19]

[11] 3,755,036

[45] Aug. 28, 1973

[54] NON-WOVEN ARTICLES MADE BY COATING FILAMENTS WITH BINDER AND DRYING THE BINDER UNTIL NON-MIGRATORY BEFORE PROVIDING FILAMENT-TO-FILAMENT CONTACT

[75] Inventors: Elmer Gordon Paquette, Madison; Karl Russell Guenther, Stoughton, both of Wis.

[73] Assignee: Bjorksten Research Laboratories, Inc., Fitchburg, Wis.

[22] Filed: Oct. 14, 1971

[21] Appl. No.: 189,125

Related U.S. Application Data

[63] Continuation-in-part of Ser. No. 876,005, Nov. 12, 1969, Pat. No. 3,616,002.

[52] U.S. Cl.......... 156/180, 117/104 B, 117/105.3, 117/115, 156/177, 156/178, 161/175
[51] Int. Cl.............................................. D04h 3/08
[58] Field of Search............. 117/115, 105.3, 104 B; 156/17 C, 133, 178, 180, 181; 161/175

[56] References Cited
UNITED STATES PATENTS
3,423,266   1/1969   Davies et al..................... 156/181 X
3,513,049   5/1970   Marzocchi........................ 156/180

Primary Examiner—Edward G. Whitby
Attorney—Johan Bjorksten

[57] ABSTRACT

This invention deals with non-woven articles made from continuous filaments, including garments and porous sheet materials. In the past, non-woven products have suffered the handicap of a stiff and "boardy" feel. We coat continuous yarn or filaments with binder while preventing substantial filament-to-filament contact and they dry them sufficiently that the binder becomes non-migrating before the filaments are deposited on a screen or mold on which the fibers are brought into contact with each other and bonding takes place. This method is particularly suitable for making garments of elastomeric fibers, not easily handled in ordinary production machinery. Another generally applicable advantage is that the resultant products are exceptionally flexible and that the articles produced do not split into stratified binder-rich and-poor areas, but are uniformly bonded throughout.

4 Claims, 9 Drawing Figures

Patented Aug. 28, 1973 3,755,036
2 Sheets-Sheet 1
*Fig. 1*
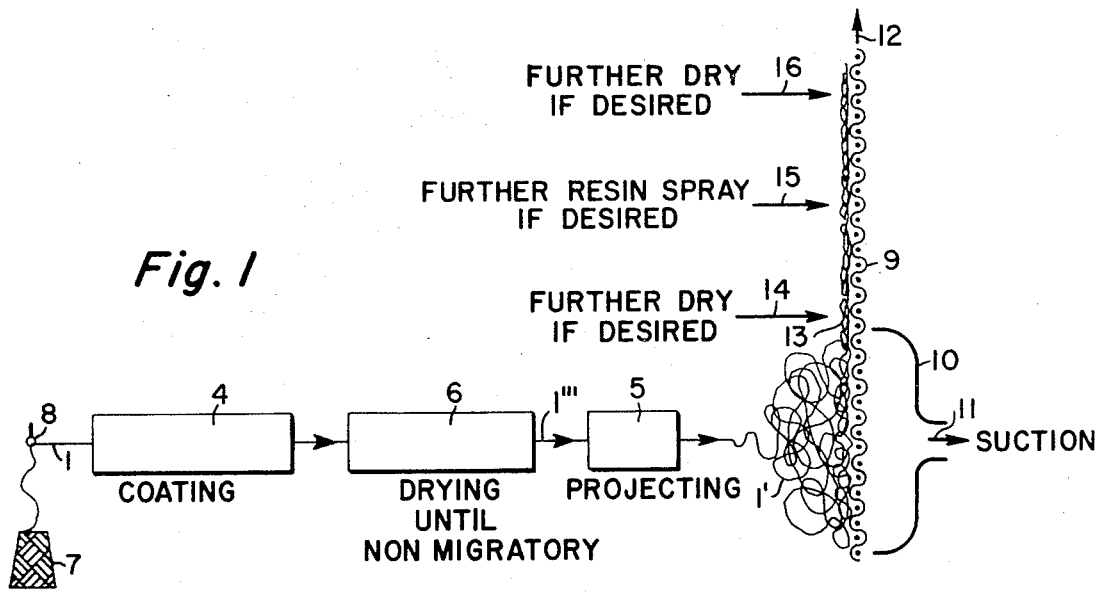
*Fig. 2*
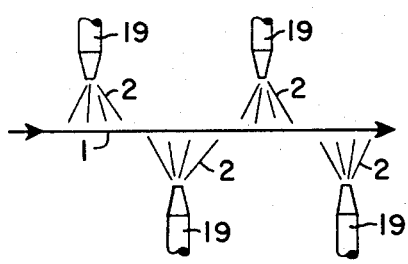
*Fig. 4*
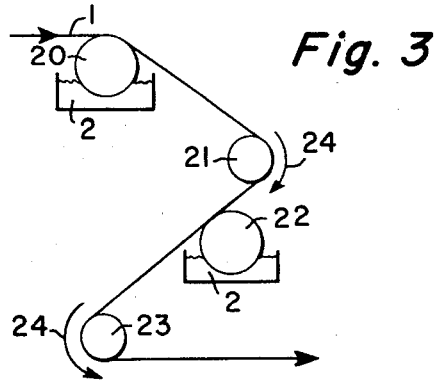
*Fig. 3*
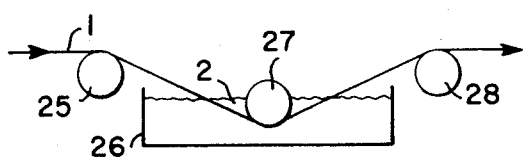
*Fig. 5*

Patented Aug. 28, 1973  3,755,036

2 Sheets-Sheet 2

NON-WOVEN ARTICLES MADE BY COATING FILAMENTS WITH BINDER AND DRYING THE BINDER UNTIL NON-MIGRATORY BEFORE PROVIDING FILAMENT-TO-FILAMENT CONTACT

CROSS-REFERENCES

This application is a continuation-in-part of application Ser. No. 876,005, filed Nov. 12, 1969, now U.S. Pat. No. 3,616,002 entitled NON-WOVEN ARTICLES MADE FROM CONTINUOUS FILAMENTS And deals with a modification of the previously described invention whereby relatively rapid production methods are made possible.

FIELD

This invention relates to non-woven fibrous products and the manufacture thereof and has as its principal object an improved and more rapid method for producing garments and non-woven fabrics than is described in the cross-referenced application.

STATEMENT OF SCOPE

This invention relates to non-woven fibrous products and to manufacture thereof and has for its principal objects a method to produce comfortable and attractive garments without the use of sewing techniques, and also the production of soft and non-boardy non-woven fabrics.

STATEMENT OF PRIOR ART

Various methods have been used for producing preforms for subsequent impregnation with hardening resins to form automotive parts, boats and the like. These have included spraying glass roving onto perforated suction plates, and subsequent impregnation with resin, for example by means of suction, pressing and centrifugal casting. It is also known to make hats from felted fibers molded on forms, and set by resinous binders. Such methods have been used also with fibers to form non-woven textiles.

The difficulty heretofore encountered in producing such textiles, is that the binder customarily applied in a solution and subsequently dried during the drying process will migrate to the periphery, where the evaporation is most rapid. As a result, the binder is enriched on the surface of the web, resulting in stiffness, while the center portion thereof is starved on resin and easily parts or delaminates. It has been attempted to remedy this by applying the binder in solid form, by dusting or mixing throughout the fiber mass, but this procedure is far less rapid and convenient, and a significant portion of the binder material is wasted because it is either not lodged at crossover points of fibers, which by capillary forces selectively attract liquid binders, or they provide an excess of binder, suitable for stiff products such as shoulder pads, but undesirable for garments generally.

STATEMENT OF OBJECTIVES

An object of this invention is a bulky fabric or mat in which the binder is uniformly distributed through the fabric.

Another object is a method for producing fabrics or mats in which the binder is uniformly distributed throughout the structure.

Another object is a process for making a soft and pliable non-woven article, in which particles are deposited upon fibers uniformly from all sides, while such fibers are suspended in a gaseous medium, said particles having a viscosity higher than 100 centipoise as deposited.

Another object is a process for making a uniform non-woven article in which the binder is in solution in a volatile solvent, said binder being applied, and said solvent substantially removed, while said fibers are not in contact or only minimal contact with each other.

Further objects will become apparent as the following detailed description proceeds.

SHORT STATEMENT OF THE INVENTION

In accordance with our invention, we coat continuous filaments with a binder comprising a volatile solvent and essentially remove said solvent while the filaments still remain essentially free from contact with each other. We are using the word "filament" in a broad sense to include any flexible textile strands, of essentially unlimited length, including also such strands or yarns as are made of a multiplicity of shorter fibers, such as for example staple yarns or cotton or woolen yarns. In this fashion, the stiffening of the binder prior to bringing the fibers into close contact with each other precludes further movement of the binder, particularly the migration which until now has greatly impaired the non-woven fabrics.

When the binder is applied so that a coherent film is formed over the surface of the fiber, the evaporation of solvent while the fibers still are substantially out of contact with each other will impede further enrichment or local impoverishment by migration. When the binder is applied so as to form tiny droplets on the fiber surfaces, migration is likewise impeded by evaporation while the fibers are still floating in the gaseous envelope, substantially unrestrained by contact with each other. An additional advantage is gained in that those parts of the fibers which are free from resin retain their original suppleness and flexibility, so that the resultant product does not have the "boardy hand" or stiffness which until now has generally characterized non-woven fabrics.

THE DRAWINGS

Figure 7:
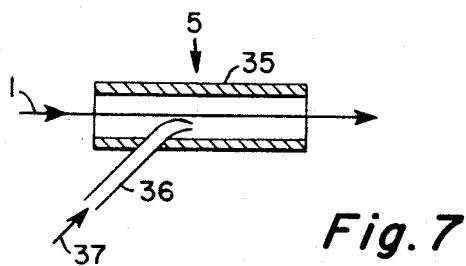
Figure 9:
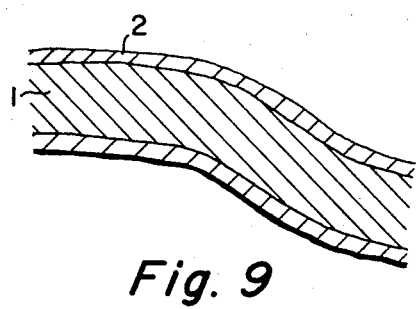
Figure 8:
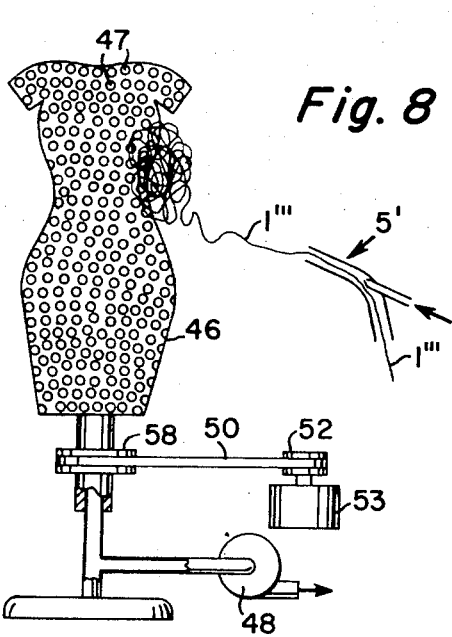

The invention is further described with reference to the drawings wherein:

FIG. 1 is a schematic view of the process;
FIG. 2 is a schematic view of one embodiment of a coating step;
FIG. 3 is a schematic view of another embodiment of a coating step;
FIG. 4 is a schematic view of another embodiment of a coating step;
FIG. 5 is a schematic view of another embodiment of a coating step;
FIG. 6 is a schematic view of another embodiment of a coating step;
FIG. 7 is a cross sectional schmatic view of air gun type pulling and projecting means;
FIG. 8 is an elevation of the application of the invention to production of a garment; and sectional detail view;
FIG. 9 is an enlarged view of a filament produced in accordance with the invention.

Referring now to FIG. 1, 7 is a fiber supply such as a pirn or roll of a continuous fiber, 5 is projection means, for example, a pair of rollers which rotate so as to advance the fiber, of which there may be many, or the air gun of FIG. 7, so as to impart to them a velocity in the range of 60 to 10,000 ft/min and preferably 500 to 5,000 ft/min. The fiber is coated by coater 4.

Coater 4 may be the coater of any of FIGS. 2,3,4,5 or 6. Fiber 1 is pulled from package 7 through eyelet 8 and thence through coater 4 and drier 6 by the aforementioned pulling means or projecting means 5. As it leaves projector or puller 5 it is directed into relatively still ambient air and piles up into convolutions 1'. Its deposition on screen 9 may be aided by providing air flow through the screen by withdrawing air from plenum 10 as indicated by arrow 11. The fibers coated with binder contact each other at suitable points of contact where they are adhered together when deposited on screen 9 to form a non-woven fabric or web as indicated at 13. Further drying may be carried out as indicated at 14. Further resin may be applied as indicated at 15 and further drying may be carried out as indicated at 16.

Screen 9 may be caused to travel past plenum 10 and projecting means 5 as indicated by arrow 12 by reason of being a portion of an endless screen belt or a drum of screen material in a manner well known in the art and hence not shown for simplicity.

In FIG. 2, fiber 1 is coated by causing it to pass against pad 17 saturated with resin binder and thence against pad 18 saturated with resin binder.

Fiber 1 is coated in accordance with the embodiment of FIG. 3 by being passed first over transfer roller 20 immersed in resin binder 2, thence over idler 21 thence over transfer roller 22 immersed in resin binder 2 and thence over idler 23 in the direction indicated by arrow 24.

Fiber 1 is coated in accordance with the embodiment of FIG. 4 by applying resin binder 2 sprayed thereagainst from nozzles 19.

Fiber 1 is coated in accordance with the embodiment of FIG. 5 by passing first over idler 25, thence into resin 2 contained in reservoir 26, thence under idler 27, thence out of resin 2 and thence over idler 28.

Fiber 1 is coated in accordance with the embodiment of FIG. 6 by passing first between a pair of rolls 29 and 30, thence through pulley or projector means indicated generally as 5 which may be the means 5 of FIG. 7. Fiber 1 is thereby directed into an enclosure provided by members 31 wherewithin by reason of contact with relatively slowly moving ambient air it forms convolutions 1'' as shown. Fog of droplets 2' of binder resin may be provided by injecting binder resin 2 from nozzle 32 into the enclosure provided by members 31. Fiber may be withdrawn from convolutions 1'' by pulling means such as provided by rolls 33 and 34 and be pulled away from rolls 33 and 34 by pulling or projector means indicated generally as 5. In FIG. 7 there is shown air gun type pulling and projecting means indicated generally as 5 which may comprise a relatively straight tube 35 through which fiber 1 may pass. Extending into the interior of tube 35 there may be provided a second tube 36 into which air may be introduced as indicated by arrow 37 to provide movement of fiber 1 in the direction indicated by the arrow heads thereon.

In FIG. 9 is shown a fiber 1 coated with resin binder 2 in accordance with the process of the invention.

In FIG. 8 there is shown a step in the manufacturing of a woman's dress in accordance with the invention by directing fiber 1''', produced in accordance with the embodiment of FIG. 1 against mold 46 by means of a projecting device indicated as 5' which may be identical to or similar to that shown in FIG. 7. Mold 46 be a be mold for a lady's garment as shown and is covered over its entire surface with perforations 47 through which air is sucked continually by means of suction means 48 which exhausts air from the hollow interior of mold 46 so as to create a continual suction through the perforations. Pulley 58 attached to the base of the mold may be made to revolve continually by belt 50 which may be trained over pulley 58 and pulley 52 which may be driven by motor 53.

Air gun 5' may be moved by hand or by a programmable holder so as to deposit the fiber at the desired rate. Often we prefer to project a second fiber, such as Nylon, Dacron or a high-strength cellulose such as Fortisan onto areas where a particular reinforcement is desired, that is, where the rate of wear is accentuated in use.

A suitable garment may be made by utilizing 400 denier wool yarn ejected at a rate of 1,500 feet per minute which has been coated with a binder having the composition: 48–49 percent polyvinyl acetate copolymer in water, particle size 0.15 micron, coated in accordance with the embodiment of FIG. 6.

Upon completion, the finished garment is extended so as to slip over the protruding parts of the mold and thereby removed for use.

Suitable articles have been made with the following yarns: 480 denier continuous filament nylon; 70 denier nylon; 200 denier crimped nylon; 30–20–RO2 56 duPont dacron; 50–10–S–280–SD nylon (duPont); 200 denier fiber of the elastic polyurethane known to the trade as Lycra and made by E.I. duPont de Nemours and Company; 800 denier crimped nylon; 70 denier (Spandex duPont Lycra); 7–1–0–280sd Nylon monofilament (duPont); 70–34–RO–56 polyester yarn (duPont) Dacron; Hycar 2671) B.F. Goodrich Chemical Co.).

As suitable binders there may be used Pliolon T–211 (Pioneer Chemical Words) diluted to 75% by volume with acetone; 0.5 percent of a polyamide such as duPont Elvamide 8061 in methanol; 5 percent Elvamide 8061 in methanol; acrylic latex containing 50 percent solids in water known as Ucar 891 (Union Carbide); urethane latex, type X–1042, 50.2 percent solids in water; Flexbond 330 (Airco Chemicals and Plastics Co.) diluted with 75 percent of its volume by weight of methanol; urethane latex X–1042 (Wyandotte Chemicals Corp.) diluted with 70 percent by volume of a n-butyl acetate; Polyco 2114 (Borden Chemical Co.); Hycar 2671 (B.F. Goodrich Chemical Co.) diluted 70 percent by volume with acetone. Rates of projection may be from 50 ft/min to 100,000 ft/min but preferably are from 3,000 ft/min to 10,000 ft/min.

Drying in the drying means 6 of FIG. 1 may be carried out by introducing hot air against fiber 1 or by directing radiant heat against the fiber to produce partially dry fiber 1'''.

The advantages of this invention are illustrated by the following comparative measurements of breaking strength:

When non-woven fabrics are produced from batts of chopped fibers via the application of a binder as Elvamide 8061, the breaking strength of the fabric drops off markedly when the binder content is reduced from a level of 31.7 to a level of 25.1 percent. With fabrics produced with the same binder via the use of continuous yarn, there is no loss in strength even when the binder content is reduced from a level of 30.1 to a level of 17.2 percent.

Furthermore, at comparable levels of binder, i.e., 30.1 percent and 31.7 percent, the fabric produced from the continuous yarn had 1.9 times the strength of the fabric produced with chopped fibers.

The data substantiating these conclusions is shown in the following table:

Effect of Binder Concentration of the Breaking Strength of Non-Woven Fabrics Produced with Chopped Nylon Fibers and Continuous Yarns

| Fiber Form | % Elvamide 8061 | Breaking Strength of 1" Wide Sample (lbs.) |
| --- | --- | --- |
| Chopped | 31.7 | 18.5 |
| Chopped | 25.1 | 8.9 |
| Continuous Yarn | 30.1 | 34.8 |
| Continous Yarn | 17.2 | 35.3 |

Use of these fibers and binders in the apparatus of the figures results in attractive fabrics or mats of much improved softness over corresponding products made according to prior art.

While the above examples illustrate some of the embodiments of the invention, it is evident that the scope is substantial. The fabrics of the invention have a thickness generally higher than 0.007 inch, as below this level the plasticizer migration due to flow of the binder during the drying step is not accentuated, and most strongly applies to fabrics having a thickness range from 0.010 inch to 0.600 inch.

The present invention is particularly valuable in the fabrication of garments from fibers so elastic that they cannot be handled at normal production speeds on a knitting machine or on weaving equipment. Thus, the invention is particularly applicable to fibers having a rubberlike character, the elasticity being generally characterized by a fully reversible elongation of more than 100 percent.

The resultant products are characterized by the absence of the previously prevalent migration of binder to the outer layers in the drying process. Thus, the central layers of the fabrics of the inventions are substantially indistinguishable from the outer layers on the basis of binder concentration, boardiness, stiffness and bonding strength, and the fabrics do not tend to part along planes of stratification when pulled apart by force applied perpendicularly to a flat surface.

The particles of the binder projected as a fog in FIG. 6 have a viscosity which at the time they become attached to the fibers, and there are allowed to aggregate, is sufficient to prevent capillary migration. This is generally a viscosity higher than 1,000 centipoise. To retain the ability to bind, there should be still some cohesive tendency. The upper limit of viscosity at the bonding step is generally about $10^5$, however, this is more readily adjusted and can be reached for example by application of heat in the bonding process, so as to effect adhesion when the adhesive at room temperature has hardened to a point where adhesiveness had all but vanished.

We prefer to employ binders in which the particles of the fog when sprayed comprise 10 percent to 50 percent of solid, 5–15 percent of a liquid solvent therefor which has a boiling range substantially between 75° and 120°C and 55–75 percent having a boiling range substantially between 37° and 48°C.

We contemplate a structure of continuous filaments which have distributed substantially uniformly on their surface discrete, non-connected droplets of adherent resinous of polymeric material. The droplets in question are in the finished article substantially dry to the touch, but have been made to form bridges or points of adhesion between the fibers touch they rouch two fibers, or droplets on another fiber usually at intersections of the fibers or filaments, or where these touch or almost touch each other. The bonding may have been effected at a stage of the process when the droplets were not yet quite dry to the touch, but yet dry enough to resist any capillary forces which might cause excessive spreading out or migration.

The fibers or yarns sprayed in this process are practically endless, so that they can be sprayed through the projection means as a continuous stream of connected matter. So long as this is possible, it does not matter greatly if a continuous yarn is made of continuous filament, or by spinning staple fiber, or natural fibers such as cotton, jute or wool.

The particularly preferred fibers are those which cannot otherwise be made into elastic knit structures, such as fibers or yarns of rubber, or of elastic polyacrylates, or elastomeric polurethanes having elastic estensibility in excess of 100 percent, such as Lycra. The invention is applicable to fibers of the synthetic thermoplastics, such as Nylon, polyethylene glycol terophthalate, polyvinyl fluoride, split film fibers, for example of polypropylene, polyolefin fibers generally, polyphenoxide fibers, polyoxymethylene, also to fibers extruded or drawn as thermoplastic but subsequently crosslinked, chemically or by exposure to ionizing radiation, and which may even decompose before melting, polyacrylate or methacrylate fibers, and the like, including also fibers not yet invented but of substantially equivalent mechanical properties to the above.

While the binder compositions are preferably solutions, when rapid spraying and drying is desired, we may also in some cases employ water latices. When these are sprayed, we prefer to maintain the mold at a temperature of about 180°–230°F in order to enhance the rate of evaporation. Suitable latices are, for example:

Ucar 891 – Union Carbide, Inc.
Urethane Latex, Type X-1042 – Wyandotte Chemical Corp.
Flexbond 330 – Airco Chemicals & Plastics, Inc.

The water latices are preferably used with slit film type of fibers having a width of at least 15 microns, or with fast drying synthetic monofilaments.

With "kinetic stability" we mean capillary and other surface forces, so that a droplet or film deposited will stay put when the fiber is deposited on the mold or where its final bonding takes place, and will not then further spread or migrate so as to change the distribution or concentration thereof.

With "contact points" we mean those points on the fibers were they come in contact with another fiber, or another part of the same fiber so that bonding can be effected.

Having thus disclosed our invention, we claim:

1. The process for producing a non-woven structure which comprises continuously coating at least portions of continuous filaments while substantially not in contact with each other with a solvent containing resinous binder medium which may migrate along the filaments, then evaporating a portion of said solvent to increase the viscosity of said coating to substantially prevent migration of said coating along the filaments, then evaporating a portion of said solvent to increase the viscosity of said coating to substantially prevent migration of said coating along the filaments, then projecting the filaments so as to form semi-static randomly looped three dimensional configurations, then depositing the configurations of said filaments on a receiving means and evaporating the residual liquid from the binder on the filaments so as to cause the filaments to adhere to each other at points of contact.

2. The process of claim 1, in which the binder has a viscosity in excess of $10^3$ centipoise, and below $10^5$ centipoise.

3. The process of claim 1, in which the binder comprises 10–50 percent of solid, 5–15 percent of a liquid solvent therefore which has a boiling range substantially between 75° and 120°C and 75–55 percent of a solvent having a boiling range substantially between 37° and 48°C.

4. The method of claim 1, wherein the step of coating comprises the step of suspending the filaments in a gaseous ambient.

* * * * *